(12) United States Patent
Nilsen et al.

(10) Patent No.: US 7,654,782 B2
(45) Date of Patent: Feb. 2, 2010

(54) WELD NUT OR STUD, FASTENING SYSTEM AND METHOD

(75) Inventors: Martin J. Nilsen, Hampshire, IL (US); Michael E. Ward, Geneva, IL (US)

(73) Assignee: Illinois Tool Works Inc., Glenview, IL (US)

( * ) Notice: Subject to any disclaimer, the term of this patent is extended or adjusted under 35 U.S.C. 154(b) by 647 days.

(21) Appl. No.: 11/518,759

(22) Filed: Sep. 11, 2006

(65) Prior Publication Data

US 2007/0092354 A1   Apr. 26, 2007

Related U.S. Application Data

(60) Provisional application No. 60/729,369, filed on Oct. 21, 2005.

(51) Int. Cl.
*F16B 37/06*   (2006.01)
(52) U.S. Cl. .................. 411/171; 411/177; 29/525.05
(58) Field of Classification Search ............... 411/171, 411/172, 84, 85, 88, 98, 108, 177, 119; 29/525.05
See application file for complete search history.

(56) References Cited

U.S. PATENT DOCUMENTS

| 2,029,089 | A | * | 1/1936 | Weirauch | 248/223.21 |
| 2,306,180 | A | * | 12/1942 | Myers et al. | 220/200 |
| 2,784,758 | A | * | 3/1957 | Rohe | 411/171 |
| 3,435,871 | A | * | 4/1969 | Johnson | 411/171 |
| 4,359,813 | A | * | 11/1982 | Mauer | 29/469.5 |
| 4,409,460 | A | * | 10/1983 | Nishii et al. | 219/93 |
| 4,523,883 | A | * | 6/1985 | Peterson et al. | 411/171 |
| 4,620,815 | A | * | 11/1986 | Goetter | 411/84 |
| 5,199,836 | A | * | 4/1993 | Gogarty | 411/84 |
| 5,222,851 | A | * | 6/1993 | Dickerson | 411/397 |

* cited by examiner

*Primary Examiner*—Gary Estremsky
(74) *Attorney, Agent, or Firm*—Mark W. Croll; Paul F. Donovan

(57) ABSTRACT

A threaded fastener such as a weld nut or a weld stud has a projection from a surface thereof, with the projection bearing a thread. A weld ring substantially surrounds the threaded projection. In a fastener system using the fastener, a mounting structure has a keyhole including a larger diameter hole and a narrower diameter slot. In the assembly, a portion of the weld ring projects into the slot to resist rotation of the fastener relative to the mounting structure.

13 Claims, 2 Drawing Sheets

WELD NUT OR STUD, FASTENING SYSTEM AND METHOD

CROSS-REFERENCE TO RELATED APPLICATIONS

The present regular United States Patent Application claims the benefits of U.S. Provisional Application Ser. No. 60/729,369 filed on Oct. 21, 2005.

FIELD OF THE INVENTION

The present invention relates generally to fasteners and, more particularly, the invention pertains to weld nuts or weld studs that are secured in assemblies for engaging complementary fastener components in blind fastening situations.

BACKGROUND OF THE INVENTION

It is known to use so-called "weld nuts" or "weld studs" as part of fastener systems in various assemblies. It is known to secure the weld nut, weld stud or other component in a fixed position for later engagement with the complementary component of the fastener system, when it is difficult to access the nut or other fastener component in the completed assembly. For example, it is known to use weld nuts in blind locations on automobile frames where components later secured to the frame are positioned in a laid on assembly where the nut is not visible but must anchor a component overlying the nut. Weld nuts are used also in installations in which the anchoring component is of insufficient thickness to be threaded for anchoring a fastener, such as a bolt, directly. Again, by way of example, automobile frames are of such construction wherein frame members may be tubular to provide sufficient frame strength but each side of the tube is relatively thin and insufficient for threading to anchor a bolt to be secured thereto.

In such installations, weld nuts have worked satisfactory, but are not without deficiencies. After the second component of the fastener system has been secured in the nut and the two parts of the assembly drawn together, the security of the weld holding the nut in place is often inconsequential as the two components are secured together. However, if it is desired to disassemble the assembly, since the nut often is not accessible, the security of the nut in its mounted location is important to allow the bolt to be loosened therefrom without the nut spinning together with the bolt. Further, when completing the assembly, it is necessary to tighten the bolt sufficiently and the nut must stay in fixed position to allow proper tightening without the nut spinning with the bolt.

It is known to provide the surface of the weld nut or weld stud which is to bear against the sheet metal or supporting material with a plurality of raised integral projections or nibs. The weld nut or stud can be secured to the supporting material by resistance welding, which causes the projections to flow and alloy with the supporting material. If the weld is not secure, or if the fastening system is subjected to excessive torque or other forces, the weld zones can break loose, thus allowing the weld nut or stud to spin when the complementary fastener portion is connected thereto or disconnected therefrom.

It can happen that the thread of the complementary fastener component or the thread on the weld nut or weld stud itself can be malformed or damaged during handling or installation. This then has the effect of increasing the torque required during installation or disassembly. Application of increased torque on the welded attachment can cause the weld to fail, freeing the weld nut or weld stud from the installed position. Since the weld nut or weld stud is used specifically because it will be inaccessible in the completed assembly, if the weld fails and the weld nut or weld stud is freed, significant difficulties can result.

Accordingly, what is needed in the art is a fastener system utilizing a weld nut or weld stud which is more resistant to the application of high torque on the welded joint.

SUMMERY OF THE INVENTION

The present invention provides a fastener system in which portions of a weld nut or weld stud are welded to the supporting structure and also are configured to physically interfere or engage with the mounting structure when torque is applied to the fastener system.

In one aspect thereof, the present invention provides a weldable threaded fastener with a body having a first face and a second face, and a projection from the first face. The projection has a thread. A weld ring on the first side substantially encircles the projection.

In another aspect thereof, the present invention provides a fastening system with a mounting structure having a keyhole therein including a hole and a slot extending from and communicating with the hole. The slot has a width defined between opposed slot sides. A threaded fastener includes a body having a first face and a second face, the body being sufficiently small to slide through the hole and being wider than the width of the slot. A projection from the first face has a thread. A weld ring on the first face substantially encircles the projection. The first face of the body is disposed adjacent a surface of the mounting structure along the slot. The projection extends into the slot. The weld ring is welded to the mounting structure where in contact with the surface of the mounting structure, and a portion of the weld ring projects into the slot.

In still another aspect thereof, the present invention provides a method for attaching a threaded fastener to a mounting structure comprising steps of creating a keyhole in the mounting structure, including a hole and a slot extending from and communicating with the hole; and providing a threaded fastener including a body having a first face and a second face, a projection from the first side having a thread and a weld ring on the first face substantially encircling the projection. The method further includes inserting the body through the hole from a first surface of the mounting structure to a second surface of the mounting structure; positioning the projection in the slot and the first face of the fastener against the second surface of the mounting structure; welding the fastener to the second surface of the mounting structure while pulling the body toward the second surface; and locating a portion of the weld ring in the slot.

An advantage of the present invention is providing a weld nut or weld stud that can be secured to relatively thin anchoring material, such as plate metals and the like, yet which is resistant to the application of high torque forces.

Another advantage of the present invention is providing a fastener system in which a nut or stud is secured to mounting material by welding, and is provided with structure for physically interfering with the mounting material when torque forces are applied.

Still another advantage of the present invention is providing a method for fastening a weld nut or weld stud which is efficient and uses standard welding apparatus and provides a more secure fastener system.

Other features and advantages of the invention will become apparent to those skilled in the art upon review of the following detailed description, claims and drawings in which like numerals are used to designate like features.

Figure 1:
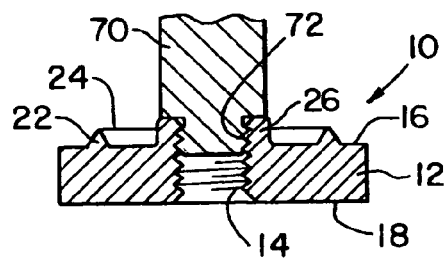
FIG. 1 is a cross-sectional view of a weld nut in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, a weld nut 10 in accordance with the present invention is shown. Weld nut 10 is a body 12 having a threaded opening 14 therethrough. Threaded opening 14 is configured to engage a male threaded fastener, such as a bolt (not shown).

Figure 3:
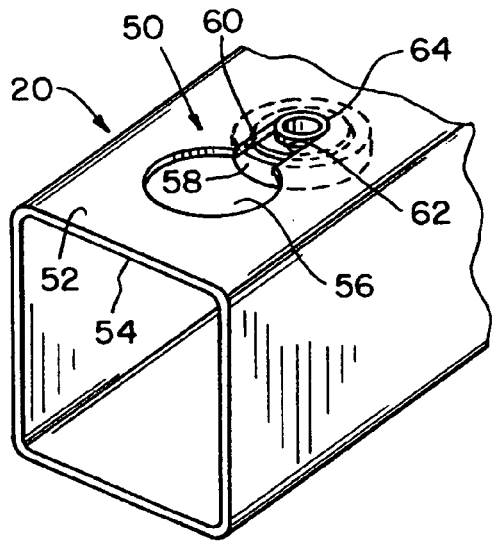
FIG. 3 is a perspective view of a weld nut of the present invention installed in a tubular mounting structure.

Body 14 has first and second faces 16 and 18 on opposite sides of thereof. One of the faces 16, 18 is configured to confront a surface of a mounting structure 20, such as a tubular mounting structure 20 as shown in FIG. 3. In the exemplary embodiment shown, surface 16 is configured to confront structure 20.

Surface 16 is provided with a substantially continuous weld ring 22 that surrounds threaded opening 14. As known to those skilled in the art, weld ring 22 is material suitable for welding body 12 to mounting structure 20 when subjected to a welding process. In the exemplary embodiment shown, weld ring 22 has a substantially triangular cross-sectional shape, with a narrow distal peak or ridge 24 and a broader base at surface 16.

In the exemplary embodiment shown in FIG. 1, a boss 26 is provided as a projection from surface 16 within and substantially encircled by weld ring 22. Threaded opening 14 extends also through boss 26.

Figure 2:
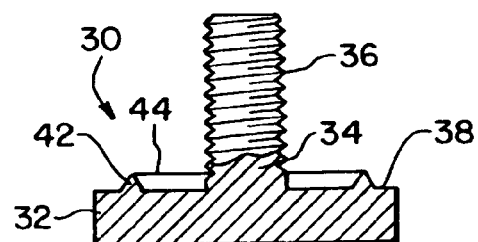
FIG. 2 is a cross-sectional view of a weld stud in accordance with the present invention.

Referring now to FIG. 2, a weld stud 30 in accordance with the present invention is shown. Weld stud 30 includes a body in the way of a head 32 and a shaft 34 with an external male thread 36 formed on the outer surface of shaft 34. Head 32 defines first and second faces 38, 40 on opposite sides thereof, with first face 38 having shaft 34 extending as a projection therefrom. A substantially continuous weld ring 42 is provided on face 38, substantially encircling shaft 34. Weld ring 42 is of material suitable for welding head 32 to mounting structure 20 during a welding process. Weld ring 42 is similar in shape to weld ring 22, having a broader base at surface 38 and narrower distal peak or ridge 44, thus providing a substantially triangular cross-sectional shape for weld ring 42.

While exemplary embodiments of a weld nut 10 and of a weld stud 30 have been shown and described with respect to FIGS. 1 and 2, it should be understood that the embodiments shown herein are merely exemplary, and the present invention can be used for weld nuts and/or weld studs of different sizes and shapes. For example and not by way of limitation, in the exemplary embodiment of weld stud 30, thread 36 is illustrated extending substantially the full length of shaft 34. It should be understood that the present invention is not limited by the size, shape or manner of threading on shaft 34, and the invention is expected to work well with shafts having threads thereon less than the full length thereof, shafts having pointed or tapered distal tips and the like. Further, the concepts of the present invention can be used also to secure structures that are more complex than just a simple nut or stud.

Mounting structure 20, which by example and not limitation is a side of a tubular mounting structure, is provided with a keyhole 50 extending therethrough, from a first or outside surface 52 to a second or inside surface 54. Keyhole 50 has a major hole 56 and a narrower slot 58 communicating with hole 56 and extending away therefrom. Hole 56 is of sufficient size to allow body 12 of weld nut 10 or head 32 of weld stud 30 to pass therethrough from the outside thereof to the inside thereof. The width of slot 58, defined between opposed slot sides 60, 62, is sufficient to allow boss 26 or shaft 34 to slide there along, but is of insufficient width for body 12 or head 32 to be pulled therethrough from inside surface 54 to outside surface 52. An end 64 of slot 58 is positioned to locate weld nut 10 or weld stud 30 in the proper axial position along the length of mounting structure 20 by the positioning of boss 26 or shaft 34 there against.

Mounting structure 20 is illustrated having an open end visible in FIG. 3; however, it should be understood that the present invention can be used in positions and on mounting structures having no access to a side there of, other than through keyhole 50. With reference to the tubular mounting structure shown, weld nut 10 or weld stud 30 is inserted through hole 56 from the outside surface 52 to inside surface 54 such that boss 26 or shaft 34 can slide along slot 58, with body 12 or head 32 otherwise substantially within tubular mounting structure 20.

Those skilled in the art will understand readily that for inserting and positioning weld nut 10 it may be advantageous to use a mandrel 70 having a male thread 72 engaged with threaded opening 14. Those skilled in the art also will understand readily that it may be advantageous and convenient when inserting and positioning stud 30 to use a mandrel 74 (FIGS. 7-9) having a female thread (not shown) engaged with thread 36. Mandrels 70, 74 can be part of a welding machine used to secure weld nut 10 or weld stud 30 in mounting structure 20. Again, those skilled in the art will readily understand that common well-known welding techniques can be used, such as resistance welding.

Ridges 24 and 44 of weld rings 22 and 42, respectively, enhance the efficiency and accuracy of welding in that the narrow distal ridges encourage arcing at the desired locations. Accordingly, during the welding process, weld rings 22, 42 are held against inside surface 54 of mounting structure 20. Specifically, weld ring ridge or tip 24 or 44 is held against or near surface 54. As welding continues, force is applied to draw weld nut body 12 or weld stud head 32 against inside surface 54. A portion 78 of substantially continuous weld ring 22 or 42 is exposed in slot 58. Without a confronting material to the exposed portion 78, as body 12 or head 32 is drawn closer to inside surface 54 during welding, the exposed portion 78 of the weld ring is drawn into slot 58. Even if the exposed portion 78 flows minimally during welding, a portion thereof remains disposed in slot 58, between and adjacent slot sides 60, 62. Accordingly, the exposed portion 78 interferes with slot sides 60, 62 and provides a physical obstruction or barrier to rotation of weld nut 10 or weld stud 30 relative to mounting structure 20.

Figure 4:
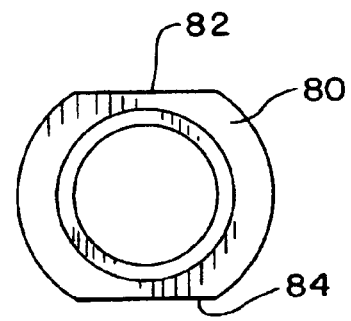
FIG. 4 is a top view of another embodiment of the present invention.
Figure 5:
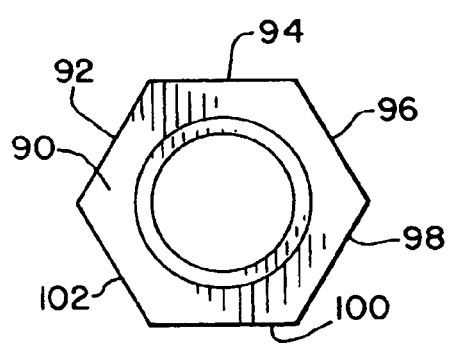
FIG. 5 is a top view of still another embodiment of the present invention.
Figure 6:
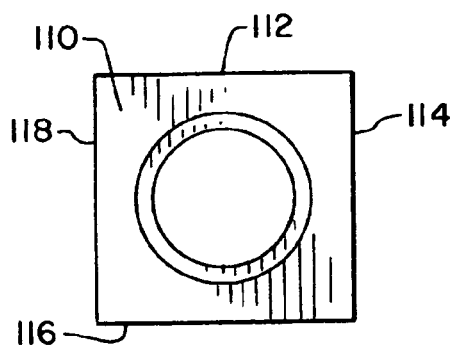
FIG. 6 is a top view of yet another embodiment of the present invention.

It should be understood that boss 26 or an unthreaded portion of shaft 34, for example, can be provided with geometric outer shapes to further resist rotation of weld nut 10 or weld stud 30 relative to mounting structure 20. For example, FIG. 4 illustrates a boss 80 having flat surfaces 82, 84 on opposite sides thereof, defining a width to fit relatively snugly within slot 58. It should be understood that while the previous embodiments shown can be positioned in any rotational position relative to slot 58, the embodiment illustrated in FIG. 4 requires proper alignment such that flat surfaces 82, 84 will slide along sides 60, 62 of slot 58. To aid in alignment, more than two flat surfaces can be used. For example, FIG. 5 illustrates a boss 90 having flat surfaces 92, 94, 96, 98 100 and 102 so that only minimal rotation is required to properly align opposed sides for sliding into slot 58. FIG. 6 illustrates yet another embodiment having a boss 110 with four flat surfaces 112, 114, 116 and 118.

Figure 7:
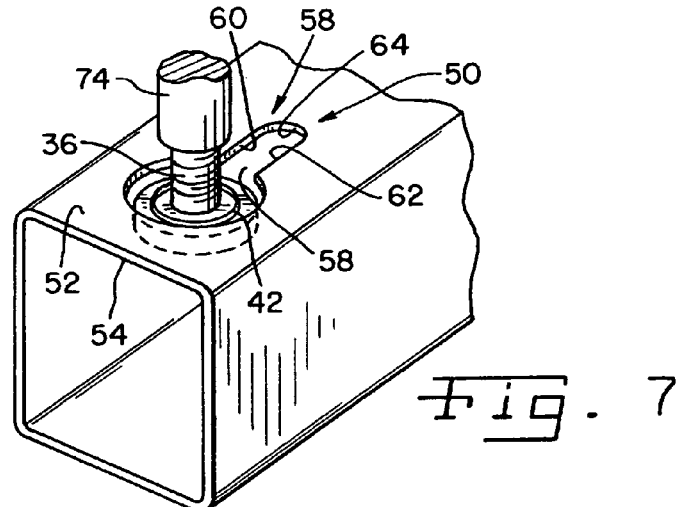
FIG. 7 is a perspective view during an the installation process for a fastener of the present invention being installed in a tubular mounting structure.
Figure 8:
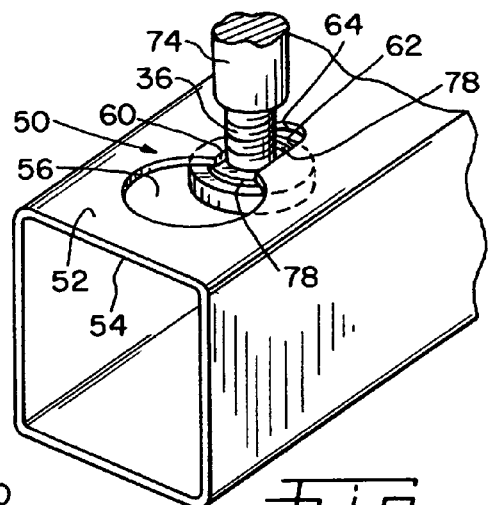
FIG. 8 is a perspective view similar to that of FIG. 7 but illustrating a later time during the installation process.
Figure 9:
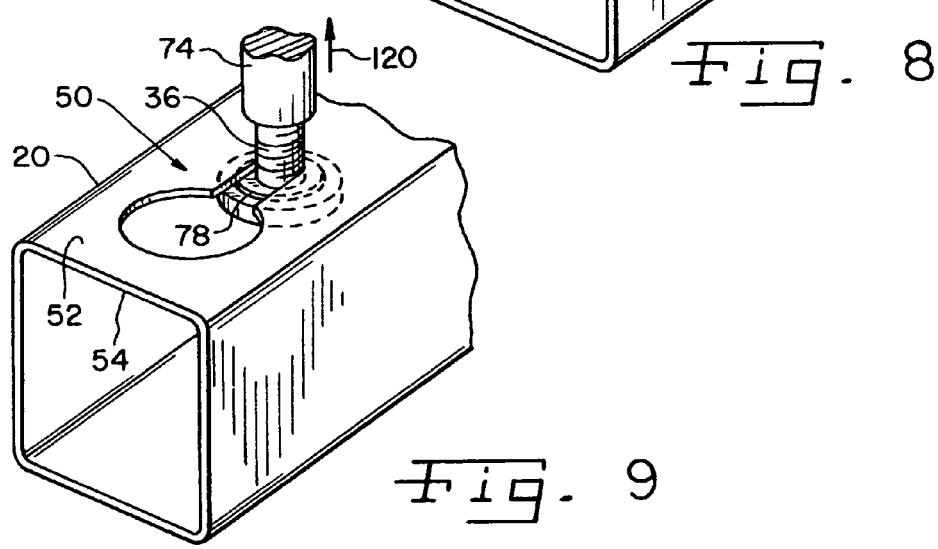
FIG. 9 is a perspective view similar to FIGS. 7 and 8, but illustrating a still later time during the installation process.

FIGS. 7, 8 and 9 illustrate various situations during an installation process for weld stud 30. Keyhole 50 is created in mounting structure 20, extending between inside and outside surfaces 54, 52. With mandrel 74 connected thereto, weld stud 30 is inserted in hole 56 of keyhole 50. When head 32 has cleared inside surface 54, shaft 34 is aligned with slot 58, and mandrel 74 translates shaft 34 along slot 58 between slot sides 60, 62 to position shaft 34 where desired. FIG. 8 illustrates shaft 34 at an intermediate position between hole 50 and slot end 64. This can be an intermediate position (FIG. 8), before shaft 34 is moved completely to slot end 64 (FIG. 9). Alternatively, a fastener of the present invention, such as weld stud 30, can be secured at an intermediate position along slot 58. If secured in a position as shown in FIG. 8, two exposed portions 78 are established, providing still further resistance to relative rotation between weld stud 30 and mounting structure 20. FIG. 9 illustrates installation as welding occurs, with force applied on mandrel 74, as illustrated by arrow 120, to urge first face 38 toward inside surface 54 and locate exposed portion 78 in slot 58 as the remaining portions of weld ring 42 weld head 32 to mounting structure 20 on surface 54 adjacent slot 58.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastening system comprising:
   a mounting structure having a keyhole therein including a hole and a slot extending from and communicating with said hole, said slot having a width defined between opposed slot sides; and
   a threaded fastener including:
   a body having a first face and a second face, said body being sufficiently small to slide through said hole and being wider than the width of said slot;
   a projection from said first face, said projection having a thread; and
   a weld ring on said first face substantially encircling said projection;
   said first face of said body being disposed adjacent a surface of said mounting structure along said slot, and said projection extending into said slot; and
   said weld ring being welded to said mounting structure where in contact with said surface of said mounting structure, and having a portion of said weld ring projecting into said slot.

2. The fastening system of claim 1, said projection comprising a boss having a threaded opening therethrough, said boss being disposed in said slot.

3. The fastening system of claim 2, said boss having at least one flat surface disposed against one of said slot sides.

4. The fastening system of claim 1, said projection being a shaft having a thread on an outer surface thereof, said shaft extending through said slot.

5. The fastening system of claim 4, said shaft having at least one flat surface disposed against one of said slot sides.

6. The fastening system of claim 1, said projection having at least two opposed flat surfaces, with one said flat surface disposed against each said slot side.

7. The fastening system of claim 6, said projection having at least four flat surfaces disposed in said slot, with two said flat surfaces disposed against said slot sides.

8. The fastening system of claim 6, said slot having an end, and said projection being disposed against said slot end.

9. The fastening system of claim 1, said slot having an end, and said projection being disposed against said slot end.

10. A method for attaching a threaded fastener to a mounting structure comprising steps of:
    creating a keyhole in the mounting structure, including a hole and a slot extending from and communicating with the hole;
    providing a threaded fastener including a body having a first face and a second face, a projection from the first face having a thread and a weld ring on the first face substantially encircling the projection;
    inserting the body through the hole from a first surface of the mounting structure to a second surface of the mounting structure;
    positioning the projection in the slot and the first face of the fastener against the second surface of the mounting structure;
    welding the fastener to the second surface of the mounting structure while pulling the body toward the second surface; and
    locating a portion of the weld ring in the slot.

11. The method of claim 10, including performing said welding step by resistance welding.

12. The method of claim 10, including attaching a mandrel to the fastener before said step of inserting; using the mandrel to perform said pulling; and detaching the mandrel from the fastener after said step of welding is complete.

13. The method of claim 10, said step of positioning including positioning the projection at an end of the slot.

* * * * *

UNITED STATES PATENT AND TRADEMARK OFFICE
CERTIFICATE OF CORRECTION

| | | |
|---|---|---|
| PATENT NO. | : 7,654,782 B2 | Page 1 of 1 |
| APPLICATION NO. | : 11/518759 | |
| DATED | : February 2, 2010 | |
| INVENTOR(S) | : Nilsen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 791 days.

Signed and Sealed this

Twenty-third Day of November, 2010

David J. Kappos
*Director of the United States Patent and Trademark Office*